Nov. 23, 1965   R. L. STARER ETAL   3,218,847
APPARATUS AND METHOD FOR MATERIAL TESTING AT HIGH STRAIN RATES
Filed June 26, 1963   3 Sheets-Sheet 1

Robert L. Starer
Edward R. Hoeft
Morris Dean
INVENTORS

BY *Clarence A. O'Brien*
and *Harvey B. Jacobson*
Attorneys

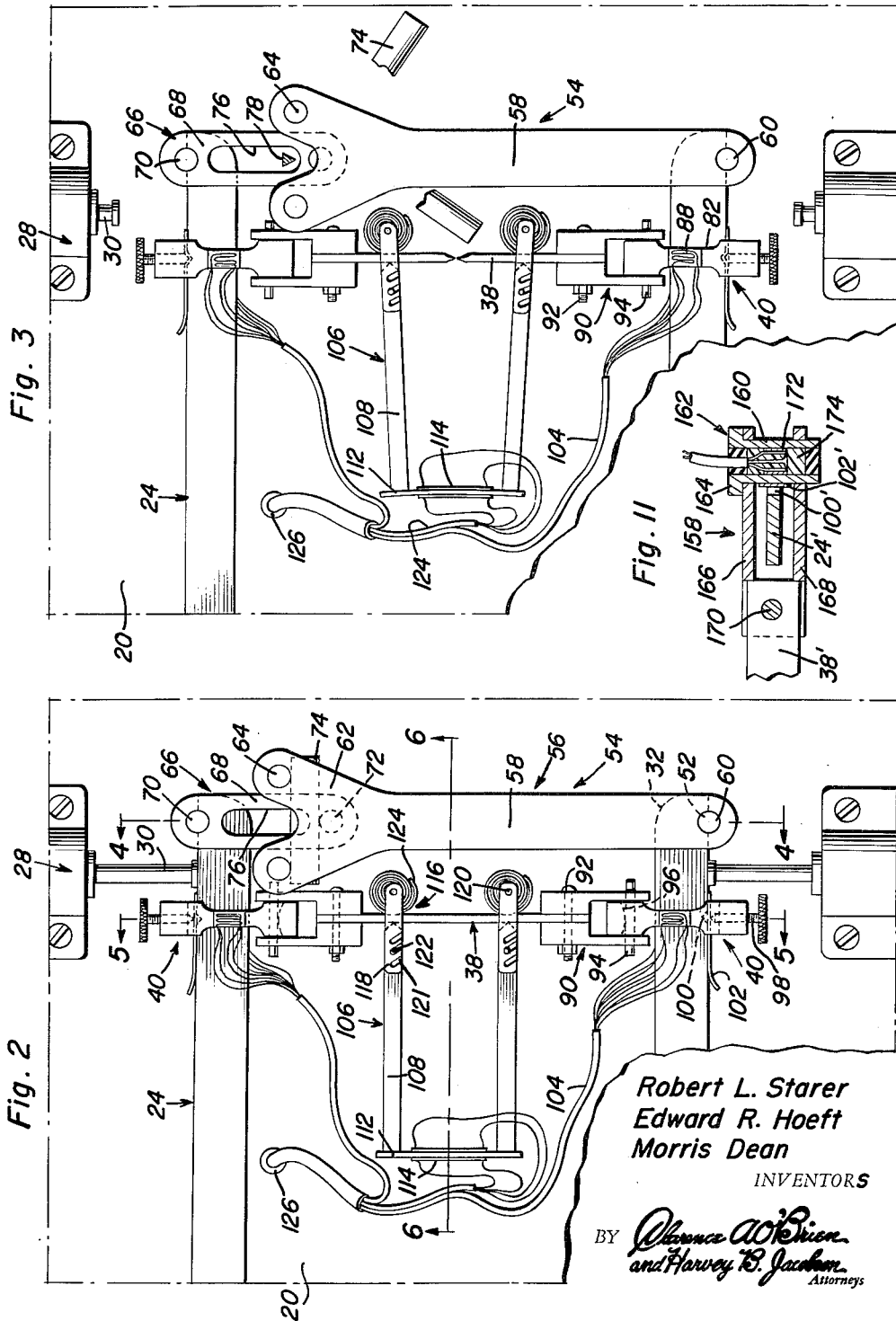

Nov. 23, 1965    R. L. STARER ETAL    3,218,847
APPARATUS AND METHOD FOR MATERIAL TESTING AT HIGH STRAIN RATES
Filed June 26, 1963    3 Sheets-Sheet 3
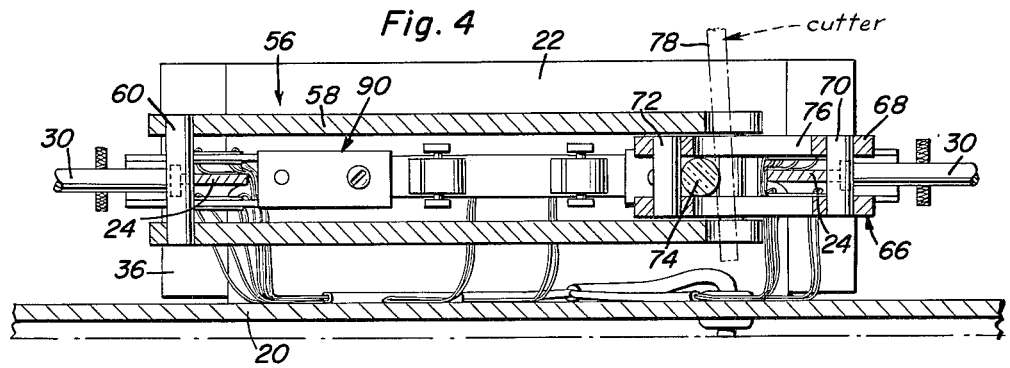
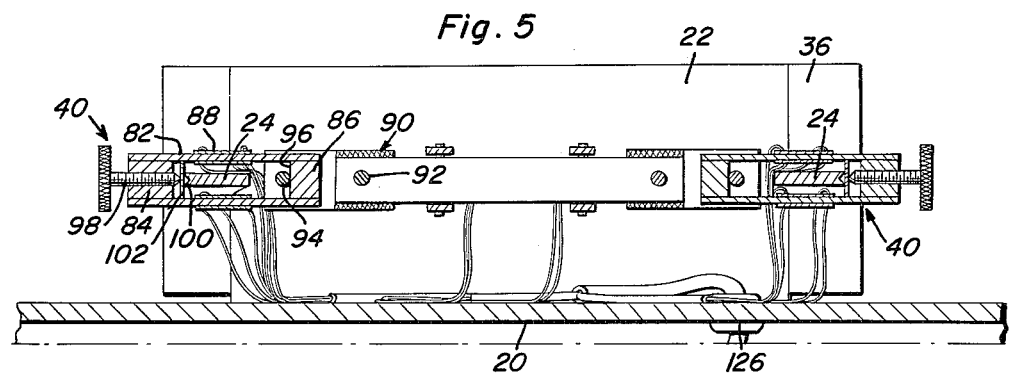
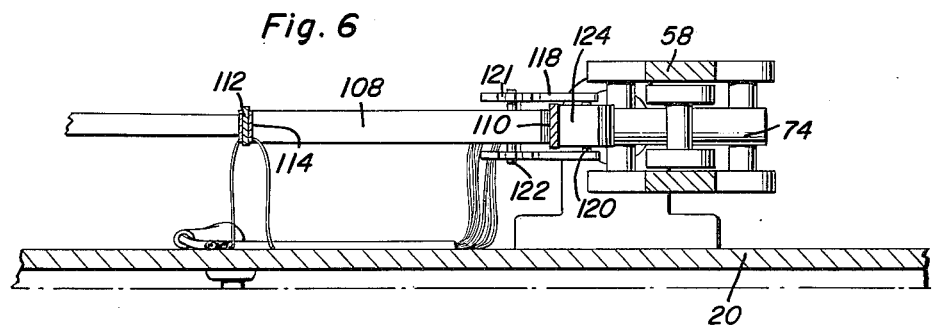
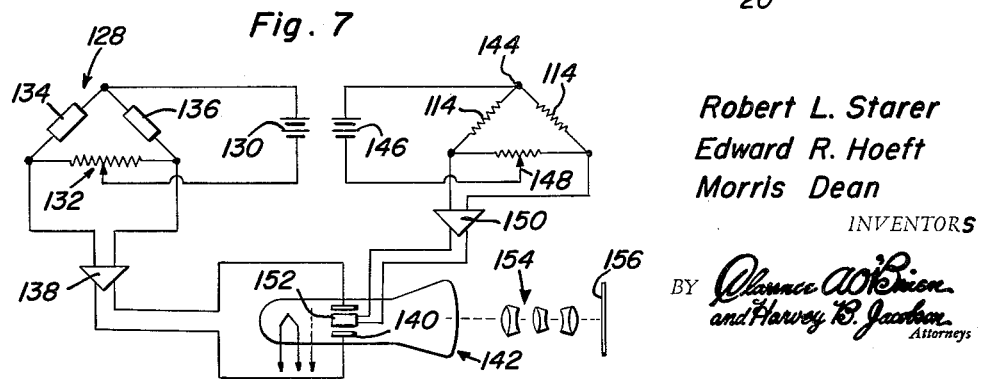
Robert L. Starer
Edward R. Hoeft
Morris Dean
INVENTORS "# United States Patent Office

3,218,847
Patented Nov. 23, 1965

3,218,847
APPARATUS AND METHOD FOR MATERIAL TESTING AT HIGH STRAIN RATES
Robert L. Starer, Trevose, Pa. (1063 Kingsley Road, Jenkintown, Pa); Edward R. Hoeft, 7920 Empire Ave., Orlando, Fla.; and Morris Dean, 24992 2nd St., Hayward, Calif.
Filed June 26, 1963, Ser. No. 290,802
26 Claims. (Cl. 73—95)

This invention relates to the testing of materials for the purpose of determining the physical properties thereof such as elasticity and ductility. More particularly, the present invention is concerned with the physical properties and behaviour of materials such as metals, fibers, polymers, etc., under impact conditions.

Testing methods and apparatuses heretofore utilized in connection with the determination of the physical properties of materials, are recognized to be unsuitable in predicting the behaviour of such materials under impact conditions since behaviour of the materials when tested under relatively low strain rates often differs considerably from behaviour under impact conditions at relatively high strain rates. For example, certain materials have been found to be substantially less ductile when tested at a high strain rate as compared to the ductility indicated under the conventional low strain rate testing procedure. Material testing methods and apparatuses heretofore proposed for specifically testing materials under impact conditions, have involved the measurement of energy absorbed in rupturing a specimen of the material. The latter methods however, have given no accurate indication of the physical property of the material inasmuch as energy measurements reflect the products of the two variables being investigated, namely stress and strain. Accordingly, in order to effectively investigate the behaviour of materials under impact conditions, it becomes necessary to separately measure both instantaneous stress and strain even though the material being tested is undergoing strain at a relatively high rate and yet stress the material at a constant strain rate.

It is therefore a primary object of the present invention to provide a method and apparatus for testing materials at a relatively high and constant strain rate while measuring instantaneous stress and strain of the material. The testing method and apparatus of the present invention therefore significantly departs from methods and apparatuses heretofore utilized wherein the highest testing speeds involved a strain rate of 20 inches per minute, obviously unsuitable for the purpose of predicting the material behaviour under impact conditions characterized for example by a strain rate of 50,000 inches per minute.

In accordance with the foregoing object, an important object of the present invention is to provide mechanical means for straining a test specimen at a rapid yet controllable strain rate from which both stress and strain measurements may be obtained and recorded. The method of the present invention therefore relies upon the predictable and calculated non-forced mechanical vibrations of an elastic member at its natural frequency after it has been deflected from a non-stress condition. A substantially linear portion of the sinusoidal displacement curve which characterizes the vibration of the deflected elastic member is therefore selected so that a test specimen may be restrictively subjected to the restoring force of the deflected elastic member in order to produce strain of the specimen at the relatively high rate which characterizes the vibratory movement imparted to the elastic member by deflection thereof. In this manner, the specimen will be under the continuous control of an external force throughout the test interval to strain the specimen at a strain rate comparable in magnitude to that involved during impact loading of the specimen when the strain rate is dependent on uncontrolled factors such as the physical properties of the specimen itself.

Another object of the present invention in accordance with the foregoing object, is to provide an apparatus by means of which a test specimen is subjected to the restoring force imposed on an elastic flexure member when released from a deflected position, having facilities for transferring the restoring force to the test specimen only when it is accompanied by a substantially constant rate of displacement, eliminating the non-linear portion of the displacement curve associated with the movement of the elastic flexure member. The test specimen is thereby subjected to a uniform strain rate causing rupture thereof within the range of the substantially linear displacement portion of the displacement curve which characterizes the movement of the deflected elastic flexure member. Thus, unlike the action involved during impact, the specimen remains under control of an external force throughout the test interval so as to prescribe the constant strain rate aforementioned.

Additional objects of the present invention is to provide in connection with the aforementioned stress applying facilities for the test specimen, a release mechanism whereby the elastic flexure member may be held in a deflected position and released therefrom by instantaneous removal of the holding force so as to avoid any loading of the elastic flexure member that could change its displacement characteristics when subjecting the test specimen to its restoring force. Accordingly, the release mechanism involves the use of a brittle material such as glass having negative stability so that any initial deformation thereof triggers accelerated rupture in order to instantaneously release the elastic flexure member from its deflected condition so as to begin the testing process.

A still further object of the present invention in accordance with the foregoing objects, is to provide facilities for mounting of a test specimen whereby the transfer of restoring force of the deflected flexure member to the test specimen is delayed for an initial take-up period so as to eliminate the non-linear portion of the displacement curve characterizing movement of the flexure member toward its undeflected position. During this take-up period, a relatively small aligning force is produced so as to hold the test specimen in operative aligment with the elastic flexure member for subsequent transfer of the restoring force thereto and thereby prevent the specimen from being subjected to any lateral vibrational effects without straining the specimen during this initial take-up period.

The apparatus of the present invention also involves novel arrangement of measuring and recording facilities whereby a stress-strain curve of the test specimen may be obtained indicative of the specimen's physical property characteristics under impact conditions because of the relatively high strain rate conditions under which the stress-strain curve was obtained. Accordingly, the measuring and recording instrumentation involves, the mounting of a strain gauge extensometer on the test specimen and strain gauges on the force transferring means connected to the test specimen in order to obtain the instantaneous strain and stress applied to the test specimen in an electrical manner for display on an oscilloscope. The oscilloscope will therefore produce an image during the relatively short testing period which represents the stress-strain curve of the test specimen, photographic means being provided to record the image so produced on the oscilloscope. Other read-out systems could of course be utilized to record, store and analyze the information obtained from the strain gauges.

These together with other objects and advantages which will become subsequently apparent reside in the details of construction and operation as more fully hereinafter"

described and claimed, reference being had to the accompanying drawings forming a part hereof, wherein like numerals refer to like parts throughout, and in which:

FIGURE 2 is a partial top plan view of the material testing apparatus just prior to the beginning of the testing process.

FIGURE 3 is a partial top plan view of the apparatus at the end of the testing process.

FIGURE 4 is a partial sectional view taken substantially through a plane indicated by section line 4—4 in FIGURE 2.

FIGURE 5 is a partial sectional view taken substantially through a plane indicated by section line 5—5 in FIGURE 2.

FIGURE 6 is a partial sectional view taken substantially through a plane indicated by section line 6—6 in FIGURE 2.

FIGURE 7 is a diagrammatic illustration of the electrical and optical instrumentation associated with the apparatus for measuring and recording the material property data obtained.

FIGURE 11 is a partial sectional view of a modified portion of the apparatus.

Figure 10:
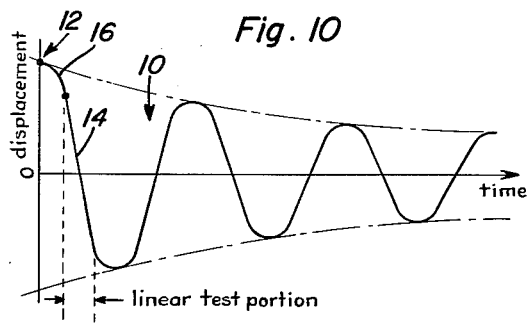
FIGURE 10 is a graphical diagram illustrating an underlying principle associated with the method and apparatus of the present invention.

Referring now to the drawing in detail, and initially to FIGURE 10, it will be apparent that when an elastic member or spring mass system is deflected from a position of rest, and then released, it will vibrate at a natural frequency depending upon the elastic modules of the elastic member, its mass and the geometry of the system as idicated by the displacement curve 10 in FIGURE 10. The displacement curve as is well known, will decay in amplitude from its initial deflection point 12 but will involve a sinusoidal change in deflection or elastic displacement that occurs at a relatively rapid rate. It will also be observed that the restoring force which is proportional to the displacement includes during the first cycle of vibration a portion of substantially linear change in displacement, forming a linear test portion 14 of the spring-mass system which is taken advantage of by the method and apparatus of the present invention. Accordingly, in accordance with the present invention, the firmly anchored flexure member may be deflected to a predetermined position developing a maximum restoring force within the elastic limit of the material and released from this deflected position so that it may undergo non-forced, mechanical vibrations as characterized by the displacement curve 10. The displacing force may then be transferred to the test specimen when the flexure member is undergoing substantially linear displacement so that the test specimen will rupture during the linear test portion 14. Accordingly, the flexure member must be selected as to the material, mass and dimensions in order to produce a linear test portion in its vibration displacement curve sufficient to strain the test specimen beyond its yield point. It will also be apparent, that transfer of the restoring force to the test specimen must be delayed for an initial takeup period so as to eliminate the initial nonlinear portion 16 of the displacement curve associated with the strain producing flexure means.

Figure 1:
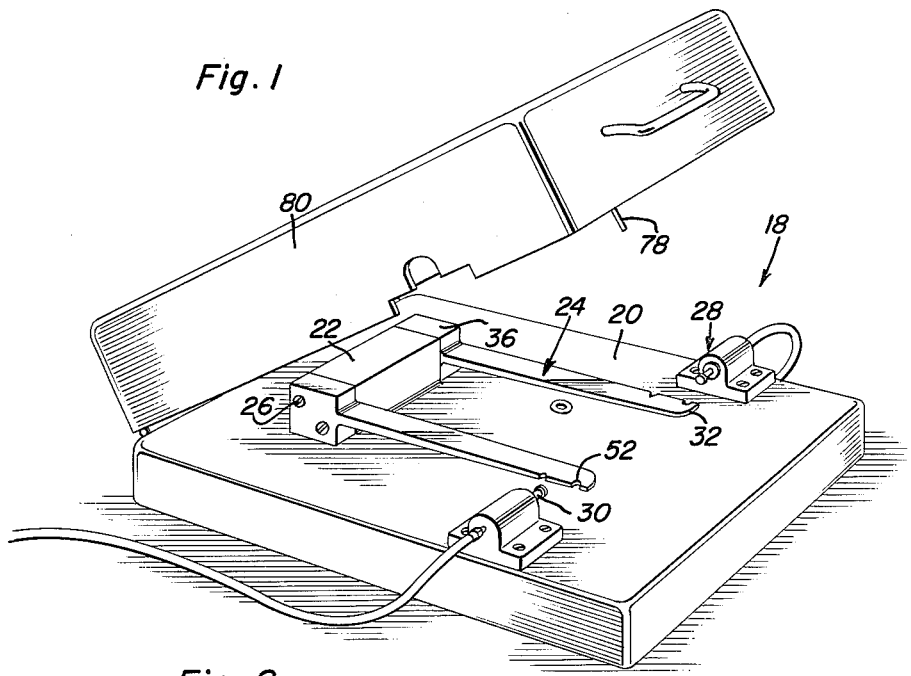
FIGURE 1 is a perspective view of a portion of the material testing apparatus including its mounting facilities.
Figure 8:
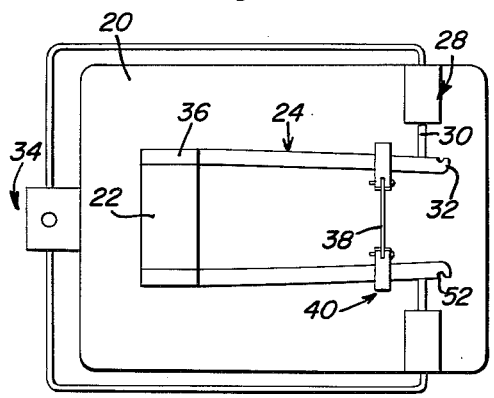
FIGURE 8 is a simplified top plan view of the apparatus corresponding to FIGURES 1 through 6.
Figure 9:
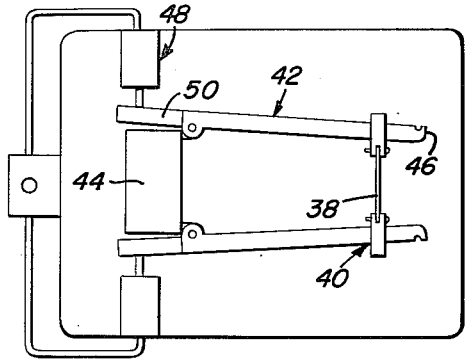
FIGURE 9 is a simplified top plan view of a modified form of apparatus.

Referring now to FIGURES 1 and 8, it will be observed that the material testing apparatus generally referred to by reference numeral 18 includes a mounting base 20 provided adjacent one end with an upstanding anchor block 22 to which a pair of flexure beams 24 are anchored in any suitable fashion as for example by the fasteners 26. Accordingly, the test specimen will be operatively connected between the pair of flexure beams 24 in order to strain the specimen from both ends. Although it is possible to fixedly anchor one end of the test specimen and have it strained by a single flexure beam, the use of two flexure beams as illustrated is preferred for testing at high strain rate inasmuch as the center portion of the test specimen would remain motionless during the test process. Also, the use of two flexure beams doubles the straining length utilizing the same load capacity and fundamental frequency of vibration associated with a single beam. Accordingly, as illustrated in FIGURES 1 and 8, the flexure beams 24 will be deflected by a pair of hydraulic deflecting devices 28 from which beam engaging piston rods 30 extend for engagement adjacent the free ends 32 of the beams 24 under control of any suitable hydraulic control assembly 34 to which the hydraulic deflecting devices 28 may be hydraulically connected. The beams 24 as illustrated in FIGURES 1 and 8 are displaced to their deflected position as cantilever beams in view of the rigid anchoring thereof at the anchoring end portion 36. The test specimen 38 may then be mounted between the flexure beams 24 by means of force transferring assemblies 40 as illustrated in FIGURE 8. Upon retraction of the piston engaging rods 30 and release of the flexure beams 24 from their deflected positions, the test specimen 38 will be subjected to the restoring force of the flexure beams as hereinbefore indicated. Alternatively, the testing apparatus may be provided with a pair of flexure beams 42 as illustrated in FIGURE 9 which are pivotally anchored to the anchor block 44. The free ends 46 of the flexure beams 42 may then be pivotally displaced to a deflected position and held in this position as the beams are stressed by actuation of the hydraulic devices 48 engaging the end portion 50 of the flexure beams. Thus, the pivotally mounted flexure beams 42 may be loaded about a fulcrum established on the anchoring block 44 as shown in FIGURE 9 after the test specimen 38 has been mounted adjacent the free ends 46 by the force transferring assemblies 40. It will be appreciated from the foregoing, that to load the flexure beams in their deflected positions a releasable holding mechanism must be applied so as to hold the beams. Restrictive transfer of the restoring force to the test specimen as aforementioned so as to produce the uniform strain thereof, is made possible because of the force transfer assemblies 40 utilized and the release mechanism to be described hereafter. Although the specimen 38 is being tested in tension by the illustrated mounting thereof by the assemblies 40, it is contemplated that other arrangements may be resorted to in order to test a specimen in flexure, shear and torsion for example.

Referring now to FIGURE 2 in particular, the facilities for controlling the strain imposed on the specimen 38 are illustrated. These facilities accordingly include both the force transferring assemblies 40 which are operatively connected to opposite ends of the test specimen 38 and are mounted on the flexure beams 24 spaced from the free ends 32 thereof, the free end portions being provided with semi-circular recesses 52 for receiving the opposite end portions of a releasable holding mechanism generally referred to by reference numeral 54. The releasable holding mechanism 54 includes an elongated link assembly 56 consisting of a pair of parallel spaced link members 58 interconnected at one end by a pin 60 engageable within the recess 52 of one of the flexure beams 24. The opposite ends of the link members 58 are provided with diverging portions 62 which are respectively interconnected by a pair of pins 64. Also associated with the release mechanism 54, is a relatively short link assembly 66 including a pair of parallel spaced slotted link elements 68 interconnected at one end by a pin 70 for engaging the recess 52 in one of the flexure beams 24, the opposite ends of the link elements 68 being interconnected by a pin 72. As more clearly seen in FIGURE 4, the ends of the link elements 68 interconnected by the pin 72 extend past the pins 64 between the link members 58 of the elongated link assembly 56 so that a frangible rod element 74 may be inserted between the pins 64 and the pin 72 in order to resist separation between the link assemblies 56 and 66. Accordingly, the releasable holding mechanism 54 may be mounted by the recesses 52 adjacent the ends 32 of the flexure beams so as to hold these flexure beams in deflected position after retraction of the piston rods 30 by the hydraulic deflecting devices 28. It should also be appreciated that the parts of the holding mechanism are designed in relation to the relative masses of the flexure beams to maintain identical vibration characteristics. The frangible rod element 74 will be made of material capable of resisting the load placed thereon by the pins 64 and 72 at spaced locations therealong when the link assemblies 56 and 66 are loaded by the flexure beams in their deflected position. The slots 76 are formed in the slotted link elements 68 so as to expose an intermediate portion of the frangible rod element 74. The frangible rod element is made of a material which has sufficient strength to resist the loading imposed on the link assemblies 56 and 66 but is absolutely brittle so that it may be ruptured in such a manner so as to abruptly remove the holding force which holds the flexure beams 24 in their initial deflected positions in order to permit free displacement of the flexure beams solely under the influence of the elastic restoring force. The rod element 74 may therefore be made of a material such as glass having the negative stability property aforementioned. The glass rod 74 may therefore be fractured so as to release the flexure beams by a cutter element 78 which may be projected into the slots 76 through which the rod element 74 is exposed. The cutter element 78 may therefore be conveniently mounted on a cover member 80 hingedly mounted on the mounting base 20 as illustrated in FIGURE 1 so that upon closing of the cover member 80, the glass rod 74 may be ruptured to begin the testing procedure. In this manner, the operator may be protected from any flying fragments resulting from either rupture of the frangible rod element 74 or the test specimen 38 as illustrated in FIGURE 3. Alternatively, the flexure beams may be loaded as for example by the arrangement shown in FIGURE 9, whereby rupture of the frangible element is effected by overloading thereof.

As hereinbefore indicated, the force transfer assemblies 40 are not only arranged to mount the test specimen between the flexure beams, but to also delay transfer of the restoring force to the test specimen so as to avoid stressing thereof during the non-linear displacement of the flexure beams toward the undeflected positions thereof. Accordingly, each of the force transferring assemblies 40 as more clearly seen in FIGURES 2 and 5, includes a pair of spaced tension links 82 of a predetermined thickness so as to undergo a certain amount of strain during the testing process, these tension links being interconnected at opposite ends by block elements 84 and 86. The intermediate portion of the link elements 82 which straddle the flexure beam 24, mount on both sides thereof, strain gauge elements 88. Accordingly, each force transferring assembly 40 has associated therewith four strain gauge elements as more clearly seen in FIGURE 5. These strain gauge elements are conventional and commercially available, involving a non-conductive mounting for a sensitive resistance wire cemented to the tension link so as to be deformed therewith. Deformation of the sensitive resistance wire with the tension link will therefore produce a change in its ohmic resistance by means of which the strain imposed on the tension link may be accurately measured. Strain gauges 88 are therefore mounted on each side of each tension link 82 so that the resulting measurement obtained from deformation of the tension link during the testing process, will truely reflect the tensile stress applied to the tension links to the exclusion of any bending stresses produced from axial non-alignment between the force transferring assemblies and the test specimen. The material of the tension link 82 is therefore selected so that the tensile strain will be proportional to the tensile stress by a known amount. Each end of the specimen 38 is therefore secured to a suitable clamp assembly 90 as for example by the fastener element 92, the clamp assembly being provided with a pin 94 that engages an arcuate surface 96 on the connecting block 86 as more clearly seen in FIGURES 2 and 5. The specimen 38 will therefore be selfaligned between the force transfer assemblies 40 when a light aligning force is applied without straining the specimen. Accordingly, the connecting block 84 in each force transferring assembly is provided with an internally threaded bore through which an adjustable takeup screw element 98 extends having a projecting end adapted to be initially spaced from a seating recess 100 formed in the flexure beams 24. Each takeup adjustment screw element 98 is therefore provided with a knurled end for adjustment thereof and is initially spaced from the seating recess 100 by means of a thin foiled spacing shim 102. The spacing shim 102 will therefore be sufficient during the takeup movement of the force transferring assembly 40 in seating the projecting end of the screw element 98 in the seating recess 100, to apply a relatively small alignment force on the test specimen 38 so that it will be operatively aligned between the flexure beams upon subsequent transfer of force thereto. The value of the small aligning force will depend on the material and geometry of the spacing shim element 102. The depth of the seating recess 100 and the adjustable spacing of the screw element 98 will therefore be selected so as to produce a delay in the transfer of the displacing force from the flexure beams to the specimen upon release of the flexure beams from the deflected position by the release mechanism. Thus, the delay of the takeup period may be regulated so as to eliminate the nonlinear displacement portion of the curve which characterizes the strain producing movement of the particular flexure beams. When the force is being transferred to the specimen, the strain imposed on the tension link 82 will be measured through the strain gauges 88 as aforementioned, the strain gauges associated with each of the force transfer assemblies being electrically connected to the electrical conduit 104 for operative connection to the measuring and recording instrumentation to be hereafter described.

Measurement of the strain imposed on the test specimen 38 during the testing process is obtained from the use of a strain gauge extensometer device generally referred to by reference numeral 106 as more clearly seen in FIGURES 2, 3 and 6. The extensometer device 106 includes a pair of elongated elements 108 having knife edge portions 110 for engagement with the specimen 38 at spaced locations therealong. The ends of the elements 108 opposite the knife edge portions 110, are interconnected by a bendable element 112 on opposite sides of which are mounted strain gauges 114 similar to the strain gauges 88 described in connection with the force transfer assembly. Adjustable clamp means 116 are mounted at the ends of the elements 108 opposite the bendable connecting element 112 whereby the extensometer device 106 is yieldably mounted on the test specimen. Each yieldable clamp device 116 therefore includes a pair of hook elements 118 interconnected by a pin 120 from which the elements extend in straddling relation to the knife edge portion 110 of the elongated element 108. The hook elements are provided with a plurality of slots 120 adapted to receive therewithin pins 122 which project from opposite sides of the elongated elements 108. Accordingly, the hook elements 118 will be adjustably mounted on the elements 108 so as to accommodate test specimens of different thicknesses against which the knife edge portions 110 abut on one side and the spiral spring elements 124 abut on the opposite side to yieldably hold the elements 108 on the test specimen. The spiral spring elements 124 are therefore anchored to the connecting pins 120 that interconnect the ends of the hook members 118. It will therefore be appreciated, that elongation of the test specimen as shown in FIGURE 3 will cause displacement of the elongated elements 108 therewith so as to cause bending of the connecting element 112 on which the strain gauges 114 are mounted. The change in ohmic resistance of the resistance wire mounted on the strain gauges 114 will therefore reflect the strain imposed on the test specimen during the testing process. The mounting of strain gauges 114 on opposite sides of the element 112 will render the extensometer device self-compensating because of variations in temperature since thermal expansion on one side of the element 112 will be the same as that on the other side of the element 112 as compared to the opposite strains produced on the respective sides by flexure due to elongation of the specimen. The strain gauges 114 are therefore electrically connected through the electrical cable 124 to the instrumentation together with the electrical cables 104 associated with the force transfer assemblies 40 in such a manner that thermally induced strains will produce no output signal. A grommeted aperture 126 may therefore be provided in the mounting base 20 through which the electrical cables may extend for connection to the electrical instrumentation.

Referring now to FIGURE 7, it will be observed that a bridge circuit 128 is provided and connected to a source of potential 130 through a zero regulating potentiometer 132. The bridge circuit will therefore include a branch 134 consisting of the eight resistances associated with the strain gauges 88 hereinbefore described, connected in series so as to form the branch. Connected in parallel with the branch 134 will be a similar resistance branch 136 as a temperature compensation branch. It will therefore be appreciated, that during the testing process, the tension link members 82 will be elongated proportionate to the tensile stress applied so as to produce an unbalance in the bridge circuit 128 reflecting the variation in tensile stress applied to the specimen 38. An output voltage will therefore be produced from the bridge circuit 128 as a measure of the variation in the tensile stress applied to the specimen, this output being amplified by the amplifier 138, the amplified voltage then being applied to the beam deflecting electrodes 140 of the oscilloscope 142 causing electron flow deflection in one plane corresponding to the variation in tensile stress applied to the test specimen. A second bridge circuit 144 is provided, both branches of which are formed by the resistances associated with the strain gauges 114 connected in parallel to the potential source 146. The zero adjusting potentiometer 148 is also associated with the bridge circuit 144 interconnecting the parallel branches thereof so that a voltage output will be produced in response to unbalance of the bridge circuit when the test specimen is being strained. The strain measuring output of the bridge circuit 144 is therefore amplified by the amplifier 150 with the amplified output voltage being connected to the electron deflecting electrodes 152 of the oscilloscope in order to deflect the electron flow in a plane perpendicular to the deflection produced by the electrodes 140. It will therefore be apparent, that during the testing process, an image will be produced by the oscilloscope forming the stress-strain curve corresponding to the test specimen. An optical system 154 may therefore be associated with the oscilloscope 142 so that the image produced thereon during the test process may be recorded on a photographic film 156 in order to produce the measurement data. Any suitable photographic equipment may be utilized for this purpose.

A modified form of force transfer assembly 158 is shown in FIGURE 11, to replace the force transfer assemblies 40 hereinbefore described. With this modified form, a substantial reduction in the number of strain gauges may be effected because of a thermal self-compensating attribute thereof similar in principle to that described in connection with strain gauge arrangement of the extensometer 106. Accordingly, a corresponding modification in the bridge circuit must be made in connection with the use of the assembly 158. It will therefore be noted in FIGURE 11, that force is to be transferred to a test specimen 38' from a flexure beam 24' having a takeup recess 100' adapted to receive therein a tubular shank portion 160 of a strain measuring device 162 having a head portion 164. The shank portion 160 is received within aligned apertures in the leg portions 166 of a clamp 168 that straddles the flexure beam 24. The specimen is therefore connected to the clamp 168 by the fastener 170 while the shank portion 160 is spaced from the take-up recess by a shim element 102' for purposes similar to those discussed in connection with shims 102 for assemblies 40. Mounted internally of the shank portion 160 are a pair of diametrically opposed strain gauges 172 operative to measure strain imposed on the device 162 by the force transferred from the flexure beam to the specimen, in a manner similar to the strain gauges 114 of the extensometer 106. Accordingly, electrical leads extend from the strain gauges 172 and the head portion 164 to the instrumentation associated with the device 162. The gauges 172 are not only protectively enclosed within the tubular shank portion, but will also be embedded in a potting material 174, such as epoxy resin, so as to isolate the gauges from environmental conditions that could adversely affect strain measurements.

From the foregoing description, the operation and utility of the method and construction and use of the associated apparatus will be apparent. It will therefore be appreciated, that the method of the present invention may be practiced by deflection of an elastic member, the restoring force of which is utilized to strain the test specimen. Although two flexure beams are utilized for this purpose as the preferred method of carrying out the invention, it will be appreciated that a single flexure beam may be also utilized with the test specimen then fixedly anchored at one end. The flexure beams may also be replaced or provided with facilities to change its effective mass and geometry in order to vary its displacement characteristics in accordance with varying test and specimen requirements. Also, although hydraulic devices have been mentioned in connection with the loading or the deflection of the flexure beams to their deflected position, it will be appreciated that other equivalent devices may be utilized. Also in connection with the practice of the method, it is essential that the flexure beams be released from the deflected position by any suitable mechanism such as that described by way of example hereinbefore, in order to instantaneously remove the holding force so as to avoid any undesired modification of the displacement curve associated with the ensuing movement of the flexure beam toward its unstressed or undeflected position. Also as a necessary feature of the method and apparatus, facilities must be provided whereby transfer of force to the specimen will be restricted to the linear displacement portion of the displacement curve associated with movement of the flexure member at which time the specimen is also being strained at a relatively rapid rate comparable to that imposed by impact loading of a specimen yet at a constant rate unlike that involved during impact loading of a specimen according to other methods. The described force transferring assemblies are therefore designed toward this end and in addition thereto provides facilities for holding the test specimen operatively aligned during the initial takeup period so as to avoid lateral vibration of the specimen from disturbing the measurement produced by the instrumentation. It will be appreciated, however, that other equivalent facilities may be provided for delayed transfer of the restoring force to the test specimen in order to eliminate the transfer of force to the specimen during any non-linear displacement of the flexure means so that strain may be imposed upon the specimen at a uniform yet high strain rate.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of testing materials at high strain rates comprising the steps of: generating an elastic displacement restoring force varying in accordance with free, mechanical vibration at a known natural frequency; mounting a material specimen for longitudinal stress by said restoring force and continuously subjecting said material specimen to said restoring force only when producing a substantially linear change in displacement, for strain of the specimen at a uniform rate.

2. The method of claim 1 wherein said restoring force is generated in the direction in which said specimen is strained during a test interval terminated by rupture of the specimen.

3. A method of testing material at high strain rates comprising the steps of: generating an elastic displacement restoring force varying in accordance with free, mechanical vibration at a known natural frequency; and continuously subjecting a material specimen to said restoring force only when producing a substantially linear change in displacement, for strain of the specimen at a uniform rate, said step of generating the restoring force comprising, deformation of an elastic member by a holding force to a loaded position; and abrupt removal of the holding force to begin stress applying movement of the elastic member from the loaded position; the step of subjecting the specimen to the restoring force comprising; delaying application of the restoring force to the specimen for a takeup period during which a nonlinear change is displacement occurs; and holding the specimen in operative alignment during the takeup period for subsequent stress of the specimen by the restoring force.

4. The method of claim 3 including the steps of: simultaneously measuring instantaneous stress being applied to the specimen and strain it has undergone; and recording said measurements.

5. A method of testing materials at high strain rates comprising the steps of: generating an elastic displacement restoring force varying in accordance with free, mechanical vibration at a known natural frequency; and continuously subjecting a material specimen to said restoring force only when producing a substantially linear change in displacement, for strain of the specimen at a uniform rate; the step of subjecting the specimen to the restoring force comprises: delaying application of the restoring force to the specimen for a takeup period during which a non-linear change in displacement occurs; and holding the specimen in operative alignment during the takeup period for subsequent stress of the specimen by the restoring force.

6. The method of claim 1 including the steps of: simultaneously measuring instantaneous stress being applied to the specimen and strain it has undergone; and recording said measurements.

7. Apparatus for testing a specimen comprising, elastic means adapted to vibrate in response to elastic deformation thereof, means operatively engageable with said elastic means for displacement thereof from an unstressed condition to a loaded condition, releasable means operatively connected to the elastic means for holding thereof in said loaded condition by a holding force that is abruptly removable, and stress applying means mounting said specimen on the elastic means for delayed transfer of force to the specimen in response to removal of said holding force to sequentially align the specimen and restore the elastic means to said unstressed condition, whereby a substantially constant strain rate is imposed on the specimen by the elastic means.

8. The combination of claim 7, including means for simultaneously measuring strain of the stress applying means and the specimen and means for recording the strain measurements.

9. Apparatus for testing materials comprising, elastic means adapted to vibrate at a predetermined natural frequency in response to deformation thereof, means operatively engageable with said elastic means for displacement thereof from an unstressed condition to a loaded condition, releasable means operatively connected to the elastic means for holding thereof in said loaded condition by a holding force that is abruptly removable, stress applying means operatively mounted on the elastic means and responsive to removal of said holding force to operatively align a specimen with the elastic means for delayed transfer of force thereto which tends to restore the elastic means to said unstressed condition, whereby a substantially constant strain rate is imposed on the specimen by the elastic means, means for simultaneously measuring strain of the stress applying means and the specimen, and means for recording the strain measurements, said elastic means comprising, a pair of beams firmly anchored in spaced relation to each other, said beams having free ends provided with aligned mounting means for engagement with the releasable means and the stress applying means to simultaneously transfer equal and opposite force to the specimen connected therebetween.

10. The combination of claim 9, wherein said releasable means comprises, a pair of links operatively connected to the flexure means, and frangible means interconnecting said links to hold the elastic means in deflected condition.

11. The combination of claim 10, wherein said stress applying means comprises, force transmitting link means operatively connected to the specimen, adjustable takeup means mounted on the link means through which force is transferred from the elastic means to the specimen and spacing means operatively spacing the takeup means from the flexure means to delay transfer of said force until deflection of the elastic means changes at a linear rate.

12. The combination of claim 11, wherein said measuring means includes an extensometer device operatively mounted on the specimen and strain gauges mounted on the force transmitting link means, said recording means including bridge circuits operatively connecting said extensometer device and strain gauges to an oscilloscope, and optical means for recording the image produced on the oscilloscope in order to obtain a stress-strain curve corresponding to the specimen being tested.

13. The combination of claim 12, wherein said extensometer device comprises, a pair of elongated elements engageable with the specimen at spaced points therealong, bendable means interconnecting said elements, adjustable means for yieldably clamping the elements to the specimen at said spaced points and self-compensating strain indicating means mounted on said bendable element for measuring bending thereof in response to displacement of said spaced points on the specimen.

14. The combination of claim 13, wherein said frangible means includes a holding element made of a material having negative stability and engageable by the links at spaced locations therealong to hold the elastic means in deflected condition until releasing fracture thereof.

15. Apparatus for testing materials comprising, elastic means adapted to vibrate at a predetermined natural frequency in response to deformation thereof, means operatively engageable with said elastic means for displacement thereof from an unstressed condition to a loaded condition, releasable means operatively connected to the elastic means for holding thereof in said loaded condition by a holding force that is abruptly removable, and stress applying means operatively mounted on the elastic means and responsive to removal of said holding force to operatively align a specimen with the elastic means for delayed transfer of force thereto which tends to restore the elastic means to said unstressed condition, whereby a substantially constant strain rate is imposed on the specimen by the elastic means, said releasable means comprising, a pair of links operatively connected to the elastic means, and frangible means interconnecting said links to hold the elastic means in loaded condition.

16. The combination of claim 15, wherein said frangible means includes a holding element made of a material having negative stability and engageable by the links at spaced locations therealong to hold the elastic means in loaded condition until releasing fracture thereof.

17. The combination of claim 7, wherein said stress applying means comprises, force transmitting link means operatively connected to the specimen, adjustable takeup means mounted on the link means through which force is transferred from the elastic means to the specimen and spacing means operatively spacing the takeup means from the elastic means to delay transfer of said force until deformation of the elastic means changes at a linear rate.

18. Apparatus for testing a specimen comprising, elastic flexure means adapted to vibrate at a predetermined natural frequency in response to deflection thereof, means operatively engageable with said flexure means for deflection thereof from an undeflected condition to a deflected condition, release means operatively connected to the flexure means for holding thereof in said deflected condition by a holding force that is instantaneously removable, stress applying means operatively mounting the specimen on the flexure means and responsive to removal of said holding force for aligning said specimen with the flexure means and delaying transfer of force to the specimen restoring the flexure means to said undeflected condition, whereby a substantially constant strain rate is imposed on the specimen by the flexure means, means for simultaneously measuring strain of the stress applying means and the specimen, an extensometer device operatively mounted on the specimen, strain gauges mounted on the stress applying means, and readout means operatively connected to the extensometer device and the strain gauges for producing a stress-strain curve corresponding to the specimen being tested.

19. The combination of claim 18, wherein said extensometer device comprises, a pair of elongated elements engageable with the specimen at spaced points therealong, bendable means interconnecting said elements, adjustable means for yieldably clamping the elements to the specimen at said spaced points and selfcompensating strain indicating means mounted on said bendable element for measuring bending thereof in response to displacement of said spaced points on the specimen.

20. Apparatus for testing a specimen comprising, elastic flexure means adapted to vibrate at a predetermined natural frequency in response to deflection thereof, means operatively engageable with said flexure means for deflection thereof from an undeflected condition to a deflected condition, release means operatively connected to the flexure means for holding thereof in said deflected condition by a holding force that is instantaneously removable, and stress applying means connecting the flexure means to the specimen during substantially linear displacement of the flexure means for strain of the specimen at a uniform rate, said stress applying means including means to delay transfer of force to the specimen following said removal of the holding force whereby the specimen is strained only at said uniform rate.

21. In a device for testing a material specimen at a strain rate experienced under impact conditions, the combination of an elastic member undergoing free displacement by an elastic restoring force means mounting the specimen in operative relation to the elastic member and force transfer means operatively connecting the elastic member to the mounting means for continuously imposing said restoring force on the specimen only during displacement of the elastic member at a substantially linear rate of movement, said force transfer means including means for delaying transfer of the restoring force to the specimen whereby the restoring force is applied only during displacement at the substantially linear rate.

22. In a device for testing a material specimen at a strain rate experienced under impact conditions, the combination of an elastic member undergoing free displacement by an elastic restoring force, and force transfer means operatively connecting the elastic member to the specimen for continuously imposing said restoring force thereon only during displacement of the elastic member at a substantially linear rate of movement, said force transfer means comprising, clamp means rigidly connected to the specimen, strain measuring means operatively connected to said clamp means for deformation in response to said transfer of the restoring force to the specimen, and spacing means operatively engageable between the strain measuring means and the elastic member for delaying transfer of force from the elastic member to the specimen through the strain measuring means to eliminate deformation during nonlinear displacement of the elastic member.

23. The combination of claim 22, wherein said strain measuring means comprises, tubular means bendable in response to transfer of said restoring force and strain gauges protectively mounted internally of said tubular means.

24. In a device for testing a material specimen at a strain rate experienced under impact conditions, the combination of an elastic member undergoing displacement by an elastic restoring force, and force transfer means operatively connecting the elastic member to the specimen for transferring said restoring force thereto only during displacement of the elastic member at a substantially linear rate of movement, said force transfer means including, means for delaying transfer of said restoring force to stress the specimen only during displacement of the elastic member at said substantially linear rate, tubular means bendable in response to transfer of said restoring force and strain gauges protectively mounted internally of said tubular means for measuring stress applied to the specimen during said displacement of the elastic member at the linear rate of movement.

25. A method of testing a specimen having a predetermined yield point without any impact loading thereof comprising the steps of: deforming an elastic material from an unstressed condition to a stressed condition within the elastic limit of the material; holding said material in said stressed condition under a restoring force; releasing said material from said stressed condition for varying the restoring force in accordance with elastic restoration of the material toward said unstressed condition; and transferring said restoring force to the specimen during a delayed test interval following release of the material to strain the specimen at a strain rate under continuous control of said varying restoring force.

26. The method of claim 25 wherein said restoring force is transferred to the specimen only during said test interval when it is effective to strain the specimen at a constant strain rate beyond the yield point.

References Cited by the Examiner

UNITED STATES PATENTS

| | | | |
|---|---|---|---|
| 2,323,724 | 7/1943 | Nadai et al. | 73—12 X |
| 2,362,589 | 11/1944 | Simmons | 73—89 |
| 2,403,951 | 7/1946 | Ruge | 73—88.5 |
| 2,416,664 | 2/1947 | Ruge | 33—147 |
| 2,475,614 | 7/1949 | Hoppmann et al. | 73—12 |
| 2,610,504 | 9/1952 | Nigh | 73—12 |
| 2,663,085 | 12/1953 | Ruge | 33—147 |
| 3,023,610 | 3/1962 | Prochazka | 73—67.4 |
| 3,083,564 | 4/1963 | Carter | 73—12 |

RICHARD C. QUEISSER, *Primary Examiner.*

DAVID SCHONBERG, *Examiner.*